United States Patent [19]

Wu

[11] Patent Number: 4,659,594
[45] Date of Patent: Apr. 21, 1987

[54] COMPOSITION AND METHOD FOR CORROSION INHIBITION

[75] Inventor: Yulin Wu, Bartlesville, Okla.

[73] Assignee: Phillips Petroleum Company, Bartlesville, Okla.

[21] Appl. No.: 298,682

[22] Filed: Sep. 1, 1981

[51] Int. Cl.$^4$ .................. B05D 3/02; C08K 5/01; C08L 63/02
[52] U.S. Cl. ............................. 427/386; 523/456; 523/463
[58] Field of Search ............... 523/463, 456; 252/390, 252/392; 427/386

[56] References Cited

U.S. PATENT DOCUMENTS

| | | | |
|---|---|---|---|
| 2,297,666 | 9/1942 | Wachter | 44/72 |
| 2,351,465 | 6/1944 | Wachter | 44/72 |
| 2,422,515 | 6/1947 | Anderson | 44/72 |
| 2,839,465 | 6/1958 | Jones | 252/8.55 |
| 2,880,194 | 3/1959 | Glaser | 260/47 |
| 2,906,720 | 9/1959 | Simpson | 260/28 |
| 3,033,784 | 5/1962 | Jones | 166/305 |
| 3,199,591 | 8/1965 | Kepley | 166/42 |
| 3,294,165 | 12/1963 | Meijs et al. | 166/33 |
| 3,355,315 | 11/1967 | Jorda et al. | 117/97 |
| 3,365,313 | 1/1968 | Roberts et al. | 252/390 |
| 3,385,358 | 5/1968 | Shell | 166/1 |
| 3,387,954 | 6/1968 | Capowski et al. | 44/72 |
| 3,398,196 | 8/1968 | Miller et al. | 260/583 |
| 3,423,264 | 1/1969 | Miron et al. | 156/71 |
| 3,427,190 | 2/1969 | Murdock | 117/132 |
| 3,455,822 | 7/1969 | Kuhn et al. | 252/8.55 |
| 3,562,198 | 2/1971 | Slocombe | 260/37 |
| 3,760,881 | 9/1973 | Kiel | 166/308 |
| 3,787,319 | 3/1974 | Larsen | 252/8.55 |
| 3,787,405 | 1/1974 | Porret et al. | 523/456 |
| 3,790,522 | 2/1974 | Bliss | 523/453 |
| 4,072,194 | 2/1978 | Cole et al. | 166/295 |
| 4,113,015 | 9/1978 | Meijs | 166/295 |
| 4,113,631 | 9/1973 | Thompson | 252/8.55 |
| 4,143,000 | 3/1979 | Doss et al. | 528/123 |
| 4,192,810 | 3/1980 | Wu | 260/348.16 |

OTHER PUBLICATIONS

Chemical Engineering World, vol. XIV, pp. 53–59 (1979).
Chemtech, Apr. 1975, pp. 210–218.
University of Tulsa, Petroleum Abstracts, vol. 20, No. 43, Abstract 284,247 (1980).

*Primary Examiner*—John C. Bleutge
*Assistant Examiner*—Robert E. L. Sellers, II
*Attorney, Agent, or Firm*—French and Doescher

[57] ABSTRACT

A composition is provided which, when applied to a metal surface, forms a corrosion-inhibiting film thereon. The composition comprises an epoxy resin, an effective amount of a curing agent for the epoxy resin, an onium salt, and a hydrocarbon diluent. The composition optionally further contains an alcohol. The onium salt can be, for example, a quaternary ammonium salt. The composition is applied by contacting the metal surface with the composition. The composition is useful in the treatment of downhole metal surfaces in oil and gas wells to inhibit corrosion of the metal.

7 Claims, No Drawings

COMPOSITION AND METHOD FOR CORROSION INHIBITION

BACKGROUND

This invention relates to the treatment of metal surfaces to increase their resistance to corrosion. It further relates to compositions which form a corrosion-resistant film on metal surfaces to which they are applied. In one aspect, the invention relates to the treatment of downhole metal surfaces of oil and gas wells to inhibit corrosion of the metal surfaces.

The problem of corrosion of metal surfaces in contact with air and water is well known. Corrosion and pitting are accelerated in environments in which metal surfaces are in contact with water having a high electrolyte concentration and with naturally-occurring chemicals such as hydrogen sulfide, carbon dioxide and organic acids. such environments are typical of downhole conditions in oil and gas wells, in which corrosion of metal pipes, pumps and other equipment poses a serious problem requiring monitoring of well sites, frequent maintenance and costly replacement of parts. Oil recovery operations in deep-sea fields present these corrosion problems in their most extreme form. These downhole metal surfaces are in contact with large volumes of corrosive chemicals such as dissolved acid gases present in the recovered oil, and, in addition, the metal surfaces are subjected to temperatures of 250° F. or higher and pressures of 3000 psig or greater, the extreme conditions of temperature and pressure acting to accelerate corrosion and to intensify the problems of identifying effective corrosion inhibitors and applying and maintaining chemical protection for the equipment. In offshore oil wells, secondary recovery operations involving water-flooding of undersea formations subject downhole equipment to highly corrosive sea water containing dissolved oxygen.

Conventional corrosion-inhibiting agents are often not effective at all under such extreme conditions or reduce corrosion significantly for only a short period of time and then must be reapplied, often at great expense and inconvenience if the well site is not easily accessible or, as in the case of off-shore wells, poses difficulties of transporting and applying large volumes of chemicals.

It is therefore an object of this invention to provide a composition which can be applied to a metal surface to inhibit corrosion and pitting on the metal. It is a further object to provide a method of treating metal surfaces so as to form a film which inhibits corrosion on the metal even under extreme conditions of temperature and pressure and in highly corrosive environments. It is a further object of the invention to provide an article having a surface film of a composition which inhibits corrosion.

SUMMARY OF THE INVENTION

According to the invention, there is provided a composition which, when applied to a metal surface, forms a corrosion-inhibiting film on the metal surface, the composition comprising an epoxy resin, an effective amount of a curing agent for the epoxy resin, an onium salt, and a hydrocarbon diluent. The composition optionally contains an alcohol. The composition can be applied by contacting the metal surface with the composition so that a film is formed thereon. The composition is preferably applied as one solution but can be applied by sequentially contacting the metal with a hydrocarbon solution of the epoxy resin and a hydrocarbon solution of the alcohol, onium salt and curing agent. Also according to the invention, metal articles having a corrosion-inhibiting film thereon are provided.

DETAILED DESCRIPTION OF THE INVENTION

Any epoxy resin having, on the average, more than one vicinal epoxide group per molecule can be used in the invention composition and process. The epoxy resin may be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group containing compound is bisphenol A are represented below by structure I wherein n is zero or a number greater than zero, commonly in the range of 0 to 10, preferably in the range of 0 to 2.

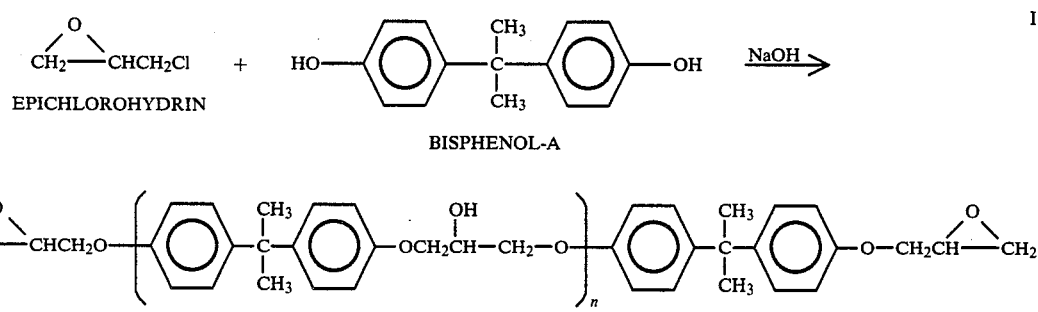

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxphenyl)methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 200 to about 1500. The commercially available Epon ®828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185–192, and an n value in structure I above of about 0.2, is presently preferred because of the superior effectiveness, as shown in field tests, of the invention composition containing Epon®828.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Such natural oils are represented by formula II:

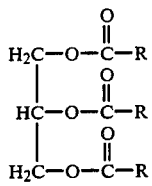

wherein R represents alkyl and/or alkenyl groups containing 15 to 19 carbon atoms with the proviso that epoxidation of said oils yields a polyepoxide having more than one vicinal-epoxy group per molecule of epoxidized oil. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like with unsaturated alcohols as described by formula III:

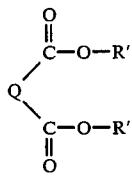

wherein Q represents a valence bond, or the following groupings: 1,2-phenylene, 1,4-phenylene, methylene, dimethylene, heptamethylene, vinylene, 1,2-cyclohexylene, 1,4-cyclohexylene, 1,2-ethylenediol and the like, and R' represents alkylene and branched alkylene groups containing 4 to 14 carbon atoms. Representative epoxidized esters derived from materials described by structure (III) include the following: di(2,3-epoxybutyl)tetrahydrophthalate, di(2,3-epoxyoctyl)oxalate, di(2,3-epoxyisobutyl)adipate, di(3,4-epoxypentyl)succinate, di(4,5-epoxydodecyl)terephthalate, di(3,4-epoxyhexyl)phthalate, di(2,3-epoxybutyl)tartrate, di(7,8-epoxytetradecyl)adipate, di(3,4-epoxybutyl)glutarate, di(2,3-epoxyhexyl)pimelate, di(3,4-epoxyoctyl)suberate, di(4,5-epoxydecyl)azelate, di(2,3-epoxyisohexyl)tetrahydroterephthalate and the like.

In addition to the foregoing, it is contemplated that suitable polyepoxides can be derived from esters prepared from unsaturated alcohols and unsaturated carboxylic acids described by formula IV:

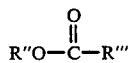

wherein R" represents alkenyl and cycloalkenyl groups containing 4 to 12 carbon atoms and R'" represents alkenyl and cycloalkenyl groups containing 4 to 12 carbon atoms. Representative epoxidized esters include the following: 2,3-epoxypentyl 3,4-epoxybutyrate; 2,3-epoxybutyl 3,4-epoxyhexanoate; 3,4-epoxyoctyl 2,3-epoxycyclohexane carboxylate; 2,3-epoxydodecyl 4,5-epoxyoctanoate; 2,3-epoxyisobutyl 4,5-epoxydodecanoate; 2,3-epoxycyclododecyl 3,4-epoxypentanoate; 3,4-epoxyoctyl 2,3-epoxycyclododecane carboxylate and the like.

Other unsaturated materials which can be epoxidized to give resins suitable for use in the instant process include butadiene based polymers such as butadiene-styrene copolymers, polyesters available as derivatives of polyols such as ethylene glycol with unsaturated acid anhydrides such as maleic anhydride, and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-dicarboxylate; dioctyl 3,4,7,8-diepoxyhexadecanedioate; diethyl 5,6,9,10-diepoxytetradecanedioate and the like.

Dimers of dienes such as 4-vinylcyclohexene-1 from butadiene and dicyclopentadiene from cyclopentadiene can be converted to epoxidized derivatives which are suitable for use in the instant process.

Any agent suitable for curing epoxy resins may be used in the invention composition and method. Curing agents for epoxy resins include amines, acids, anhydrides and aldehyde resins. The curing agent is used in an amount effective for curing the amount of epoxy resin used.

Curing agents suitable for use in the invention composition and process include compounds having amino hydrogen atoms. These include aliphatic, cycloaliphatic, aromatic and heterocyclic amines. Examples of curing compounds include aliphatic polyamines such as ethylenediamine, diethylenetriamine, triethylenetetramine, tetraethylenepentamine, 1,4-diaminobutane, 1,3-diaminobutane, hexamethylenediamine, 3-(n-propylamino)propylamine, N,N'-diethyl-1,3-propanediamine, hexapropyleneheptamine, penta(1-methylpropylene)hexamine, tetrabutylenepentamine, hexa(1,1-dimethylethylene)heptamine, di(1-methylbutylene)triamine, pentaamylenehexamine, tri(1,1,2,-trimethylethylene)tetramine, tetra(1,3-dimethylpropylene)pentamine, penta(1,5-dimethylamylene)hexamine, 5-methyl-1,9-nonanediamine, penta(1,2-dimethyl-1-isopropylethylene)hexamine and N,N'-dibutyl-1,6-hexanediamine.

A class of polyamines particularly suitable for use in the invention are N-alkyl- and N-alkenyl-substituted 1,3-diaminopropanes and mixtures thereof. Examples of such polyamines include N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of N-alkylated and N-alkenylated diamines can be used in the invention. The presently preferred polyamine is a commercial product sold under the trademark Duomeeen®T. This product is N-tallow-1,3-diaminopropane in which the majority of the tallow substituent groups are alkyl and alkenyl containing from 16 to 18 carbon atoms each, with a minority of substituent groups having 14 carbon atoms each. It is presently believed that the effectiveness of Duomeen®T in the corrosion-inhibiting composition stems from its relatively high molecular weight, which produces a long-chain "net" to cover the metal surface, its polyfunctionality, and its relatively high boiling point, which permits its use in high-temperature environments. Other commercially available materials include N-coco-1,3-diaminopropane in which the majority of the coco substituent groups contain 12 to 14 carbon atoms, commercially available under the tradename Duomeen ®C, and N-soya-1,3-diaminopropane, which contains $C_{18}$ alkenyl groups along with a minor proportion of $C_{16}$ alkyl groups.

Additional polyamines suitable for use in the invention can contain 3 or more nitrogen atoms as illustrated by the following examples: N-dodecyldiethylenetriamine, N-tetradecyldiethylenetriamine, N-tetradecyldipropylenetriamine, N-tetradecyltriethylenetetramine and the corresponding N-alkenyl triamines.

Other curing agents which can be used include polyfunctional nitrogen-containing compounds such as, for example, amino acids, amino alcohols, amino nitriles, and amino ketones; sulfonic acids; carboxylic acids; and organic anhydrides.

The invention corrosion-inhibiting composition includes at least one onium salt adjuvant such as, for example, a sulfonium salt, a quaternary ammonium salt, a sulfoxonium salt, or a quaternary phosphonium salt. The presently-preferred onium salt adjuvants are quaternary ammonium salts such as, for example, dodecyltrimethylammonium chloride, sold under the tradename Arquad ®12-50.

In general, quaternary ammonium salts suitable for use in the instant invention are described by formula V:

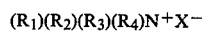

$$(R_1)(R_2)(R_3)(R_4)N^+X^- \quad\quad V$$

wherein $R_1$, $R_2$, $R_3$ and $R_4$ may be the same or different alkyl, alkenyl and aralkyl moieties containing individually in the range of 1 to 18 carbon atoms, with the conditions that the total number of carbon atoms does not exceed 40 and at least one of the groups contains at least 7 carbon atoms.

In formula V, $X^-$ represents a halide ion such as chloride, bromide, or iodide as well as other acid-derived anions such as acetate, hydrogen sulfate, and dihydrogen phosphate. The chloride salts are currently preferred on the basis of availability and cost. The representative Arquad ® compositions are available from Armak Chemicals Division of Akzona Inc. of Chicago, Ill. Additional quaternary ammonium adjuvants denoted herein as CTHAB and CTHAL represent, repectively, hexadecyltrimethylammonium bromide and hexadecyltrimethylammonium chloride.

Examples of suitable sulfonium, sulfoxonium and phosphonium salt adjuvants are described in U.S. Pat. No. 4,192,810, the disclosure of which is hereby incorporated by reference. Onium salt adjuvants of the present process include many known phase transfer catalysts.

Representative quaternary ammonium salt adjuvants for use in the present process are derived from naturally-occurring materials such as soybean oil, tallow, coconut oil and the like. These materials contain 1 to 3 methyl groups with one or more long-chain aliphatic groupings. The tallow-derived compositions possess primarily (on the average) saturated and unsaturated $C_{16}$ and $C_{18}$ radicals as the so-called long-chain aliphatic groupings. The coconut oil-derived compositions possess long-chain aliphatic radicals containing from about 10 to about 18 carbon atoms. A representative analysis of such materials shows about 5 percent $C_{10}$ radicals, about 55 percent $C_{12}$ radicals, about 15 percent $C_{16}$ radicals and about 5 percent $C_{18}$ radicals. Soybean oil-derived materials possess saturated and unsaturated $C_{16}$ to $C_{18}$ radicals in somewhat different proportions than the tallow-derived and coconut oil-derived materials. Typical compositions suitable for use in the invention composition include trimethyl tallow ammonium chloride, dimethyl dicoco ammonium chloride, dimethyl soya benzyl ammonium chloride, dipropyl tallow hexyl ammonium bromide, and methyl trisoya ammonium chloride.

Synthetic quaternary ammonium salt adjuvants useful in the invention compositions are prepared, for example, by the alkylation of aliphatic amines with methyl chloride as is known in the art. The useful amines are primary and secondary aliphatic amines bearing alkyl radicals containing about 7 to 18 carbon atoms. Thus, for example, the resulting methylated quaternary salts contain from about 10 to about 40 carbon atoms. Representative quaternary ammonium compounds include dioctyl dimethyl ammonium chloride, octyl trimethyl ammonium bromide, octadecyl trimethyl ammonium chloride, didodecyl dimethyl ammonium bromide, tetradecyl trimethyl ammonium chloride, dioctyl dimethyl ammonium bromide, ditetradecyl dimethyl ammonium chloride, heptyltrimethylammonium bromide, and decyltrimethylammonium bromide.

Suitable alkyltrimethylammonium halides are represented by the formula VI:

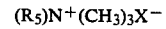

$$(R_5)N^+(CH_3)_3X^- \quad\quad VI$$

wherein X represents a halogen atom such as chlorine, bromine or iodine and R represents a hydrocarbon chain containing about 7 to about 18 carbon atoms. Suitable adjuvants include specific compounds in which $R_5$ represents a single hydrocarbon moiety; however, many of the available compositions contain $R_5$ groups with varying numbers of carbon atoms which on the average contain 12 to 14 carbon atoms. The quaternary ammonium salt is often found in commercial form as a salt solution in an alcohol such as, for example, isopropanol and water. For example, a preferred quaternary ammonium salt is available as Arquad ®12-50 which reportedly contains by weight 50% dodecyltrimethylammonium chloride, about 34% isopropanol and about 15% water. The so-called "dodecyl" alkyl moiety in Arquad ®12-50 comprises about 90% dodecyl, about 9% tetradecyl and about 1% octadecenyl. Another commercially available quaternary ammonium salt adjuvant is Arquad ®C-50, which reportedly contains by weight about 50% cocotrimethylammonium chloride, about 1% sodium chloride, about 36% isopropanol and about 13% water. The "coco" moiety in Arquad ®C-50 comprises about 8% octyl, about 9% decyl, about 47% dodecyl, about 18% tetradecyl, about 8% hexadecyl, about 5% octadecyl and about 5% octadecenyl. Additional quaternary ammonium salt adjuvants include a 1:1 mixture of trimethyl tallow ammonium chloride and dimethyl dicoco ammonium chloride (Arquad ®T-2C-50), trimethyl dicoco ammonium chloride (Arquad ®S-50), trimethyl octadecyl ammonium chloride (Arquad ®18-50), trimethyl coco ammonium chloride (Arquad ®C-50; further containing isopropyl alcohol), trimethyl coco ammonium chloride (aqueous solution) (Arquad ®C-33; this product contains no isopropanol), and dimethylakylbenzylammonium chloride (Arquad ®B-100).

Alcohols suitable for use as optional components of the invention system include any alcohols containing at least one —OH functional group. These include alkanols containing 1 to about 15 carbon atoms such as methanol, ethanol, 1-propanol, 2-propanol, butanols, pentanols, hexanols, heptanols, octanols, 1-pentadecanol, and mixtures of these. Polyols containing 2 to 5 carbon atoms such as ethylene glycol, 1,3-propanediol, 2,3-butanediol, glycerol and pentaerythritol can also be used. Presently, methanol is preferred, particularly in an anti-corrosion composition containing xylene as the aromatic hydrocarbon diluent, Epon ®828 as the epoxy resin, Arquad ®12–50 as the quaternary ammonium salt, and Duomeen®T as the polyamine, because Duomeen®T is soluble in methanol at room temperature and because of the effectiveness of the resulting corrosion inhibiting system.

A hydrocarbon diluent is used for the invention composition. Examples of hydrocarbon diluents suitable for use in the treating agents include the isomeric xylenes, toluene, benzene, naphtha, cyclohexylbenzene, fuel oil, diesel oil, heavy aromatic oils, Stoddart solvent, crude oil, and condensate from gas wells. Presently, xylene is the preferred hydrocarbon diluent because it is an effective solvent for the other preferred components and because of the corrosion-inhibiting effectiveness of the resulting composition.

The higher-boiling aromatic hydrocarbons are particularly useful for deeper wells with higher downhole temperatures and in high-temperature gas and oil wells generally.

In some treatment methods, discussed below, it is advantageous to employ a carrier liquid or drive fluid to force a slug of the corrosion-inhibiting composition down into the well being treated. Any of the hydrocarbons listed above are suitable diluents may be used. For practical and economic reasons, diesel oil, sea water or condensate from the well being treated are preferred carrier fluids. An inert gas such as nitrogen can be used as a drive fluid.

Various alcohol-aromatic hydrocarbon azeotropes can be used in the invention compositions to supply at least partially the diluent and the alcohol components. Representative azeotropes include the following, with the weight percent of each component in parenthesis: methanol (39.1)/benzene (60.9); ethanol (32)/benzene (68); 2-propanol (33.3)/benzene (66.7); 1-propanol 16.9)/benzene (83.1); isobutyl alcohol (9.3)/benzene (90.7); 1-butanol (68)/p-xylene (32); 2-pentanol (28)/toluene (72) and hexanol (13)/p-xylene (87). It is also contemplated that impure alcohol streams such as mixed butanols resulting from oxo technology using propylene feedstock can be used in the treating compositions.

The components of the corrosion-inhibiting system can be mixed in any order, but it is presently preferred to dissolve the epoxy resin in a hydrocarbon and add to this solution a mixture containing the amine, the hydrocarbon and the onium salt adjuvant optionally in the presence of an alcohol. The alcohol may be added separately or as a component in a commercially available aqueous alcohol solution of the onium salt adjuvant "used as received." Thus, a batch of the invention treating composition can be prepared by mixing a first solution of alcohol, hydrocarbon and amine in, for example, approximately a 1:1:1 (mL:mL:g) ratio and a second solution of an epoxy resin in a hydrocarbon in about a 3:1 (g:mL) ratio and adding to the first solution an approximately 50 weight percent solution of a quaternary ammonium salt in a volume ratio of approximately 1:5 to 10:1. The corrosion inhibiting agent is prepared by mixing the first and second solutions in such proportions that the weight ratio of the combined weight of the curing agent and onium salt to epoxy resin in the final solution varies over the range of about 1000:1 to 1:500, preferably 100:1 to 1:50, and most preferably about 20:1 to 1:10. The weight percent of onium salt adjuvant in the final composition varies over the broad range of 0.1 to 90, preferably about 0.5 to about 80, most preferably about 1 to about 50. The hydrocarbon diluent can be present in any concentration in which the invention composition remains in an essentially fluid pumpable state. The weight percent of alcohol in the final composition varies over the broad range of 1 to 99, preferably 10 to 60, and most preferably 20 to 40.

The invention composition is useful for coating oxidizable metal surfaces, particularly surfaces of objects made from iron and steel. It is particularly useful for treating metal surfaces such as metal pipes and casings in oil, gas and geothermal wells, which are subjected to high temperatures and pressures and corrosive chemical agents. The composition has particular utility as a corrosion-inhibiting agent for oil wells which produce a substantial amount of water and for treatment of pipelines which carry water-containing fluids.

Downhole treatments with the corrosion-inhibiting compositions can be effected by a variety of methods depending upon the particular chemical and physical characteristics of the well being treated. When treating metal surfaces, particularly in downhole applications, the corrosion-inhibiting composition can be applied as one solution, or alternatively it can be applied by contacting the metal surfaces sequentially with a solution of the curing agent/onium salt adjuvant and a solution of the epoxy resin. In practice, the resin solution and the amine/adjuvant solution can be pumped from separate storage tanks to a static mixer at a T-juncture immediately prior to pumping the mixture downhole. The following downhole treatment methods can be used to apply the composition to metal surfaces of equipment used to recover natural fluids from a subterranean reservoir.

Batch Treatment

The invention composition comprising, e.g., epoxy resin, curing agent, onium salt adjuvant, and hydrocarbon diluent is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively, in this method, a liquid column of the treating agent can be placed in the tubing or the annular space and allowed to stand for a time which can range from 10 minutes to 24 hours before resuming production, usually at least 1 hour.

Extended Batch Treatment

The invention composition is injected into the annular space of a cased wellbore, the well is closed off, and the composition is continuously circulated with well fluids down the annulus and up the tubing for an extended period of time which can vary widely but will usually be between 2 and 48 hours. At the end of the determined time period, the well is returned to production.

Squeeze Treatment

The invention composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment

A highly concentrated slug of the invention composition containing onium salt adjuvant, alcohol, epoxy resin, curing agent and hydrocarbon diluent is injected into the tubing of a cased borehole and pressured down the tubing with a fluid column of a brine solution such as 2 weight percent aqueous potassium chloride. When the pressure is released, the aqueous brine column and the corrosion-inhibiting composition are produced up the tubing. The composition as a concentrated slug thus contacts the metal walls of the tubing and lays down a protective film as it flows in a downward and upward circuit.

Metal surfaces can also be protected by dipping or spraying the surfaces with the invention compositions and then allowing excess fluid to drain from the treated surfaces at ambient conditions. A protective film is thus formed on the metal surface without conventional heat-curing or extended air-drying treatment, although such drying treatments can be used if desired and if conditions permit it. The advantage in using an anti-corrosion system which does not required air- or heat-drying is that the system can be applied to metal surfaces which are hundreds or thousands of feet below ground level or in an environment which is always flooded with brine or other fluids.

When applying the composition to the metal tubing of, for example, a gas or oil well, it is not necessary to pre-coat the treated metal surfaces with oil or other substances prior to applying the invention composition, and the treated surfaces may or may not have an oil coating prior to the application. The invention is believed to be effective in inhibiting corrosion in wells producing as much as 95 percent brine and 5 percent oil.

The nature of the film thus formed can vary according to the particular compositions used and the environment in which it is applied, but it has been found that the film will generally be a soft, sticky layer adhering to the metal surface. It is not necessary that the composition harden to a tough coating, and it has been found in laboratory runs that the applied film tends to maintain a tacky or greasy consistency.

EXAMPLE I

This example describes the treatment of an oil well in the North Burbank field in Oklahoma to inhibit corrosion on metal surfaces of the downhole equipment. The test well was producing about 994 barrels of water per day (bwpd) and 4.5 barrels of oil per day (bopd).

The well was treated with 15 gallons of the invention inhibitor solution comprising amine curing agent, quaternary ammonium salt, and epoxy resin. Eleven gallons of Duomeen®T solution was mixed with one gallon of dodecyltrimethylammonium chloride solution (Arquad®12-50) to give 12 gallons of a mixture which was subsequently mixed with 3 gallons of a xylene solution of epoxy resin (Epon®828) just prior to injection of the 15 gallons of treatment solution into the well. The Duomeen®T solution was prepared by dissolving equal amounts of methanol, xylene and Duomeen®T. One gallon of Arquad®12-50 (approximately 50 weight percent dodecyltrimethylammonium chloride) was used as received with the composition described above. The 3 gallons of epoxy resin solution was prepared by mixing 3 parts by weight of resin with 1 part by volume of xylene. The effectiveness of this treatment to inhibit corrosion can be seen from an examination of the data of Table 1 (see corrosion rate).

TABLE I

| No. of Treatments* | Control Run[a] Corrosion Rate (mpy) | Control Run[b] Corrosion Rate (mpy) | Invention Run[d] Corrosion Rate (mpy) |
|---|---|---|---|
| 0 | 3.1 | 3.0 | 2.7 |
| 1 | 3.1 | 1.6 | 2.0 |
| 2 | 1.45 | 1.1 | 0.8 |
| 3 | 0.85 | 2.2[c] | 0.95 |
| 4 | 0.65 | 2.0 | 0.90 |
| 5 | 0.60 | 1.25 | 0.80 |
| 6 | 3.1 | 1.1 | 0.70 |
| 7 | 4.5 | 1.0 | 0.65 |
| 8 | 0.9 | # | 0.50 |
| 9 | 4.0 | 3.0 | 1.2 |
| 10 | 7.5 | 3.2 | 0.6 |
| 11 | 6.0 | 2.5 | |
| 12 | 4.0 | 3.0 | |
| 13 | 1.75 | | |

*Treatments and corrosion rate measurements were made every 4 days in the control runs. A single treatment of 60 quarts was made in the invention run.
[a]Baroid 1221 commercial inhibitor was injected in 15 qt aliquots every 4 days.
[b]An amine-epoxy resin system was injected initially as a 60 quart aliquot and then additional 15 qt aliquots every 4 days.
[c]Well was closed down for about one week between treatments 2 and 3.
Well was closed and no corrosion rate reading was taken.
[d]The invention system was initially injected as a 60 quart aliquot and no incremental aliquots of inhibitor were added. The inventive system contained Duomeen® T, Epon® 828, xylene, and Arquad® 12-50.

The superior effectiveness of the invention composition as a corrosion inhibitor is shown in the corrosion rates over the time of treatments 2 through 10. During the period of approximately 30 days, the corrosion rate for the well treated with a single portion (60 quarts) of the invention composition varied over the range of 0.5 to 1.2 mpy. Over a comparable period, the corrosion rates for the designated control runs showed in general higher corrosion rates even with more frequent treatments (i.e., 15 quarts every 4 days) of corrosion inhibitor. Results of Table 1 demonstrate the superiority of the invention composition comprising quaternary ammonium salt, polyamine, epoxy resin, alcohol, and hydrocarbon diluent over a commercial corrosion inhibitor and over a composition not containing the quaternary ammonium salt.

EXAMPLE II

This example describes the treatment of a number of additional oil wells in the North Burbank field in Oklahoma to inhibit corrosion on metal surfaces of the downhole equipment. These wells, which produce relatively large amounts of water, were treated with the inventive composition. The results are tabulated below.

TABLE II

| Well No. | Producing Well Rate (bbl oil/bbl H₂O per day) | Corrosion Rate Range (mpy) During Test Period | Test Period (Days) | Gallons of Corrosion Inhibitor |
|---|---|---|---|---|
| 1 | 6.9/588 | 0.05–1.0 | 158 | 15 |
|   |         | 0.05–0.8 | 78  | 10 |
| 2 | 5.4/1099 | 0.05–0.8 | 152 | 15 |
|   |          | 0.1–7    | 34  | 10 |
| 3 | 9/877   | 0.05–1.5 | 86  | 9  |
| 4 | 5.7/1239 | 0.15–37.5 | 63 | 15 |
|   |          | 9–85     | 42  | 10 |
|   |          | 15–50    | 36  | 10 |
| 5 | 7.3/1022 | 0.65–7.5 | 40  | 9  |
|   |          | 0.6–7.0  | 55  | 10 |
| 6 | 3/729    | 0.05–20  | 67  | 12 |
| 7 | 7.5/1086 | 0.7–20   | 40  | 9  |
|   |          | 0.2–40   | 54  | 10 |
| 8 | 18/1455  | 0.1–12.5 | 28  | 10 |

The 15 gal portions of the corrosion inhibitor were prepared as described in Example I, i.e., 11 gals. of the amine/xylene/methanol solution was mixed with 1 gal. of Arquad ® 12-50 to give 12 gallons of mixture which was subsequently mixed with 3 gals. of the epoxy resin/xylene solution. This same composition was used in all the treatments summarized in Table II.
*The commercially available quaternary salt Arquad ® 12-50 (active ingredient dodecyltrimethylammonium chloride) was used in all the runs summarized in Table II.

The runs in Table II demonstrate the effectiveness of the inventive composition in reducing corrosion rate in the North Burbank wells. The relatively high rate readings reported in the table were generally measurements taken near the end of a test period and signaled the need for retreatment of the well. The readings taken during the test period were generally in the lower end of the range reported.

EXAMPLE III

Laboratory corrosion inhibitor tests were carried out in 1-liter Erlenmeyer flasks. A 0.2 ml aliquot of the Duomeen®T solution and a 0.05 ml aliquot of the Epon®828 solution were individually added to a 50 ml sample of Teesside crude oil followed by a specified (see Table III) amount of the quaternary ammonium salt adjuvant. This mixture of crude oil and treating agents was transferred to a 1-liter Erlenmeyer flask containing 950 ml synthetic Ekofisk water (93.1 g $CaCl_2 \cdot 2H_2O$, 46.4 g $MgCl_2 \cdot 6H_2O$ and 781 g NaCl per 5 gallon distilled water). For the runs summarized in Table 3, carbon dioxide entrainmment was used for one hour to deoxygenate the water and then was discontinued. A slow stream of $CO_2$ was passed through the oil-water system to maintain a slight positive pressure of carbon dioxide. For the runs summarized in Table III, the oil-water mixture was stirred continuously with a magnetic bar. The rate of corrosion in terms of mils per year (mpy) was determined using a Corrator® monitoring system available from Rohrback Instruments. A carbon steel probe was suspended in the oil-water mixture maintained at approximately 49° C. during each run.

The runs in Table III compare results obtained from runs using the invention composition compared with a similar composition not containing a quaternary ammonium salt. The runs using the comparison system did not use stirring means other than a very slow $CO_2$ stream to maintain a slight positive pressure of $CO_2$. A solution of the polyamine curing agent Duomeen®T was prepared by mixing equal amounts of xylene, Duomeen®T and methanol. A solution of the epoxy resin Epon®828 was prepared by mixing 3 parts by weight of the resin with 1 part by weight of xylene. The quaternary ammonium salt adjuvant in the form of the commercially available aqueous alcohol solution was added in the desired amount.

The corrosion rate measurements in invention runs 3–9 in Table III show the superior effectiveness of the quaternary ammonium salt-containing corrosion inhibitor system over the quaternary ammonium salt alone (run 2) and the amine/epoxy resin system (run 1). Particularly noteworthy are the relatively lower corrosion rates (0.15 to 10) at the end of the 20–21 hour treatment period in the invention runs. To the extent that laboratory runs can predict results in the field, these results suggest the advantageous use of the invention compositions in oil wells exhibiting very high water/oil production ratios and in pipelines conveying water-contaminated petroleum-based fluids characterized by static pockets of water.

TABLE III

| Run No. | Sol. A[a] (ml) | Sol. R[b] (ml) | Quaternary Salt Sol. (ml) | Corrosion Rate 2 hrs (mpy) | 20 hrs |
|---|---|---|---|---|---|
| 1 | 0.2 | 0.05 | NONE | 45 | 9 |
| 2 | NONE | NONE | 0.025 ml | 80 | 87 |
| 3 | 0.2 | 0.05 | 0.025 ml | 55* | 0.15* |
| 4 | 0.2 | 0.05 | 0.025 ml | 44 | 0.37** |
| 5 | 0.2 | 0.05 | 0.01 ml | 42 | 10 |
| 6 | 0.2 | 0.05 | 0.001 ml | 46 | 7.5 |
| 7 | 0.2 | 0.05 | 0.1 ml | 42 | 3.4 |
| 8 | 0.2 | 0.05 | 0.5 ml | 29 | 1.7 |
| 9 | 0.2 | 0.05 | 1.0 ml | 33 | 0.83 |

[a]Solution A represents the amine/alcohol/hydrocarbon mixture.
[b]Solution R represents the resin/hydrocarbon mixture. The volume ratio of solution A to solution R is 4:1
[c]The quaternary salt solution is commercially available as Arquad ® 12-50 from Armak Chemicals Division of Akzona, Inc.
*These values were taken, respectively, at 6 and 21 hours rather than 2 and 20 hours.
**This value was taken at 21 hours.

EXAMPLE IV

The runs in this example demonstrate the effective corrosion inhibition of the invention compositions in stirred oil-water mixtures. These runs were carried out in essentially the same manner as the runs in Example 2 except that the test mixtures were stirred throughout the test period with a magnetic stir bar. The results of these runs are summarized in Table IV.

TABLE IV

| Run No. T,t | Sol. A[a] (mL) | Sol. R[b] (mL) | Quaternary Salt Solution (mL) | Corrosion Rate mpy (hrs.) | |
|---|---|---|---|---|---|
| 10T(comp) | None | None | 0.025 mL ARQUAD ® 12-50 | 85(5.15) | 0.77(19.75) |
| 11T | 0.2 | 0.05 | 0.025 mL ARQUAD ® 12-50[c] | 0.5(6) | 0.03(21.5) |
| 12T(comp) | 0.2 | None | None | 0.02(3) | 0.01(19) |
| 13T | 0.2 | 0.05 | 0.025 mL ARQUAD ® 18-50[d] | 2.6(6) | 0.14(21.5) |
| 14T | 0.2 | 0.05 | 0.025 mL ARQUAD ® C-50[e] | 3.8(7) | 1.4(22) |
| 15T | 0.2 | 0.05 | 0.025 mL ARQUAD ® C-33[f] | 2(7) | 0.5(22) |
| 16T | 0.2 | 0.05 | 0.025 mL ARQUAD ® B-100[g] | 3.5(6) | 0.42(20.75) |
| 17t | 0.2 | 0.05 | 0.25 g CTHAB[h] | 1(5) | 0.04(21.5) |
| 18t | 0.2 | 0.05 | 0.25 g CTHAL[i] | 6(6) | 0.48(22) |

TABLE IV-continued

| Run No. T,t | Sol. A[a] (mL) | Sol. R[b] (mL) | Quaternary Salt Solution (mL) | Corrosion Rate mpy (hrs.) | |
|---|---|---|---|---|---|
| 19t(comp) | 0.2 | 0.05 | None | 0.03(5.66) | 0.02(20) |
| 20t(comp) | None | 0.05* | 0.25 mL ARQUAD ® 12-50 | 61(5.25) | 0.8(19.75) |

[a]Solution A represents the amine/alcohol/hydrocarbon mixture.
[b]Solution R represents the resin/hydrocarbon mixture. The volume ratio of solution a to solution R is 4:1.
T Teesside crude oil was used in these runs.
t Tor crude oil was used in these runs.
[c]ARQUAD ® 12-50 is an aqueous isopropanol solution of predominantly dodecyltrimethyl ammonium chloride (50% active). The ARQUAD ® brand formulations of quaternary ammonium salts are available from the Armak Chemicals Division of Akzona, Inc., Chicago, Illinois.
[d]ARQUAD ® 18-50 is an aqueous isopropanol solution of predominantly octadecyltrimethyl ammonium chloride (50% active).
[e]ARQUAD ® C-50 is an aqueous isopropanol solution of trimethylcocoammonium chloride containing predominantly dodecyltrimethylammonium chloride and tetradecyltrimethylammonium chloride (50% active).
[f]ARQUAD ® B-100 is an aqueous isopropanol solution of dimethyl alkylbenzyl ammonium chloride (50% active) wherein the alkylbenzyl moieties are predominantly $C_{14}$ and $C_{16}$ entities.
[h]CTHAB represents hexadecyltrimethylammonium bromide. A 0.25 g sample of this material was used in run 17.
[i]CTHAL represents hexadecyltrimethylammonium chloride. A 0.25 g sample of this material was used in run 18.
*The resin solution was 50% EPON ® 828 and 50% xylene.

Runs 11 and 13-18 demonstrate the ability of the invention composition to inhibit corrosion. With the exception of run 14, all the invention formulations containing Duomeen®T, methanol, xylene, Epon®828 and the designated quaternary ammonium salt adjuvants maintained corrosion rates of less than 1 mil per year in the oil-water mixtures under study (see rates measured after about 20 hours). Runs 10 and 20 show the effectiveness of the quaternary ammonium salt adjuvant alone or in the presence of the epoxy resin to inhibit corrosion. Run 12 demonstrates the effectiveness of the polyamine Duomeen ®T to reduce the corrosion rate. Run 19 demonstrates the effectiveness of Duomeen®T, Epon®828, methanol, xylene system to reduce the corrosion rate.

EXAMPLE V

This example provides a hypothetical method of treatment for an off-shore well having a depth of about 15,000 feet, formation temperatures of 300° F. or higher, and pressures on the order of 5000 psig. An amine solution containing equal parts by weight of xylene, methanol, Duomeen®T and Arquad®12–50 and a solution containing 2 parts by weight Epon ®828 and 5 parts by weight xylene are used in the ratio of 2 parts by volume amine solution to 1 part by volume epoxy solution. The solutions are combined in a static mixer at a T-juncture before injection into the well. Three barrels of the inhibitor solution are injected for each 5,000 feet of 3⅞" I.D. tubing. The inhibitor is displaced down the tubing with nitrogen gas or produced gas as far as practical without injecting inhibitor into the formation, and the well is then shut down for about 1 hour. The well is then returned to normal production while 50 to 100 ppm of an emulsion breaker such as Nalfloc VH35E is injected into the produced fluids upstream of the condensate storage tank or separator. This emulsion-breaking treatment may be necessary to prevent the formation of an emulsion or highly-condensed product, presumably resulting from an injection of an excess of the concentrated inhibitor solution.

I claim:

1. A method for treating a metal surface to inhibit corrosion thereof, comprising contacting the metal surface with a composition comprising an epoxy resin, an effective amount of a curing agent for the epoxy resin, a hydrocarbon diluent present in at least an amount sufficient to maintain the composition in an essentially fluid state, and an onium salt present in an amount of from about 0.5 weight percent to about 80 weight percent, based on the weight of the composition.

2. The method of claim 1 in which the weight ratio of the curing agent to the epoxy resin is within the range of from about 1000:1 to about 1:500 and the onium salt is present in an amount within the range of from about 1 to about 50 weight percent, based on the weight of the composition.

3. The method of claim 1 in which the onium salt is a quaternary ammonium salt.

4. The method of claim 3 in which the quaternary ammonium salt is at least one alkyltrimethylammonium halide represented by the formula $$R_5N^+(CH_3)_3X^-$$

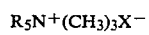

wherein X is a halogen atom and $R_5$ is a hydrocarbon chain containing from about 7 to about 18 carbon atoms.

5. The method of claim 4 in which the composition further comprises an alkanol having from 1 to about 15 carbon atoms.

6. The method of claim 3 in which the metal surface is contacted at a temperature of at least about 250° F. and a pressure of at least about 3000 psig.

7. The method of claim 6 in which the metal surface is contacted sequentially by an epoxy solution comprising the epoxy resin and a curing solution comprising the curing agent.

* * * * *